Oct. 23, 1928.
J. C. KARNES
OPTICAL READING DEVICE
Filed Sept. 30, 1926
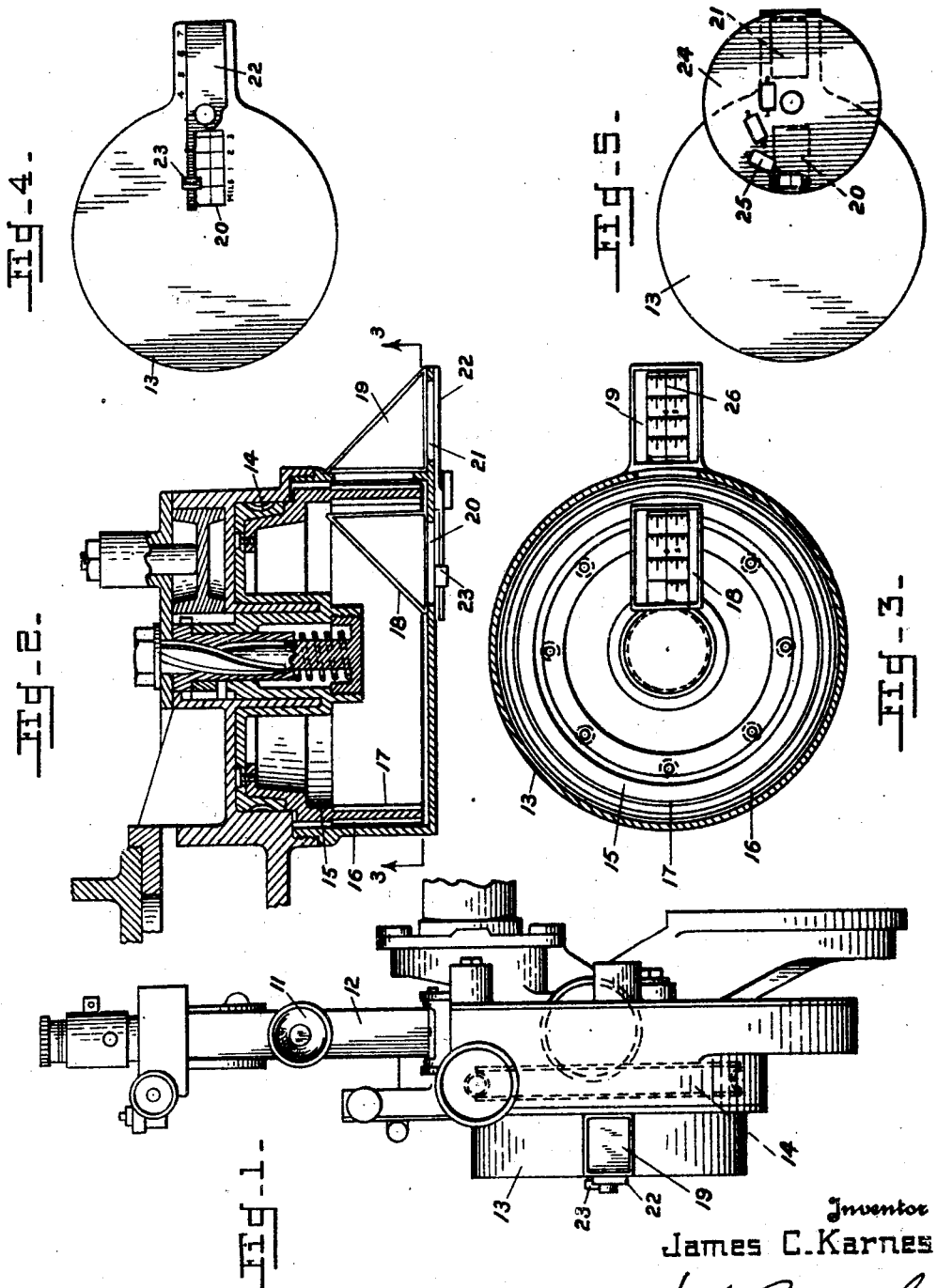
Inventor
James C. Karnes
By W. M. Roach.
Attorney Patented Oct. 23, 1928.

1,688,637

UNITED STATES PATENT OFFICE.

JAMES C. KARNES, OF BUFFALO, NEW YORK.

OPTICAL READING DEVICE.

Application filed September 30, 1926. Serial No. 138,758.

(GRANTED UNDER THE ACT OF MARCH 3, 1883, AS AMENDED APRIL 30, 1928; 370 O. G. 757.)

The invention described herein, if patented, may be manufactured and used by or for the Government for governmental purposes without the payment to me of any royalty thereon.

The subject of this invention is an optical reading device.

The quadrant sight now used in connection with the laying of heavy artillery employing separate loading ammunition includes an elevation drum on the circumference of which are generally 5 to 7 graduated scales corresponding to the zones of fire. This necessitates forming the drum much larger than is desired.

The principal object of the present invention is to provide a novel arrangement whereby the inside of the drum may be used to mount one-half of the scales.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in elevation of a quadrant sight employing the improvements of the invention;

Fig. 2 is a detail sectional view through the elevation drum;

Fig. 3 is a sectional view on the line 3—3 of Fig. 2;

Figs. 4 and 5 are detail views showing different methods of indicating the scale to be used.

Referring to the drawings by numerals of reference:

The improvements are shown as incorporated in a sight 11 of a standard type which includes the usual sight shank 12 adapted to be angularly displaced on operating the elevating mechanism contained in the housing 13.

As most clearly seen in Fig. 2 the elevating mechanism includes a worm wheel 14 to which is fixed a drum 15. Secured to the inner and outer peripheries of the drum are rings 16—17 on each of which are inscribed 4 graduated scales best shown in Fig. 3. The innermost of the scales is graduated in mils of elevation while the remaining scales numbered from 1 to 7 (Fig. 4) are graduated in yards of range and indicate the scales to be used for the corresponding zone of fire.

In order that the scales may be conveniently read from a common point, a pair of prisms 18 and 19 are arranged on the housing, one within and one exterior of the drum so that images of the scales may be reflected through the adjacent apertures 20—21 in the housing.

In order to avoid the possibility of reading the wrong scale there are shown in Figs. 4 and 5 two types of masks pivoted to the housing. The mask 22 of Fig. 4 obstructs only one group of scales and carries a sliding indicator 23 which may be set to the particular scale desired. The mask 24 of Fig. 5 is provided with a set of four openings 25 arranged to expose the scales individually.

The zero lines 26 against which the scales are to be read are inscribed on the face of the prisms adjacent the rings 16—17.

I claim:

1. A rotatable drum, a ring fixed to the inner and to the outer periphery thereof, each ring provided with a plurality of graduated scales, a housing for the drum having a pair of openings, prisms carried by the housing, one within the drum and the other exterior of the drum and means for indicating the particular scale to be used.

2. A rotatable drum, a ring fixed to the inner and outer periphery thereof, each ring provided with a plurality of graduated scales, a housing for the drum having a pair of openings, and prisms carried by the housings one within the drum and the other exterior of the drum.

3. A rotatable drum provided with a plurality of scales on its inner and outer peripheries and means for directing the images of said scales into a common plane.

4. A drum having indicia on its inner and outer peripheries, and means for directing an image of the indicia in a plane other than the plane of the periphery of the drum.

JAMES C. KARNES.